United States Patent Office 3,277,049  
Patented Oct. 4, 1966

3,277,049  
CURING EPOXY RESINS WITH DIAZA-AROMATIC TERTIARY AMINES  
Harold A. Green, Havertown, Pa., assignor to Air Products and Chemicals, Inc., a corporation of Delaware  
No Drawing. Filed Mar. 13, 1961, Ser. No. 95,036  
8 Claims. (Cl. 260—47)

This invention is directed to methods of curing epoxy resins and to compositions effective as curing agents.

Epoxy resins are cured by the crosslinking of linear epoxy polymers to form three dimensional polymers having higher strength and hardness. This is effected by reaction between active bi- or polyfunctional reagents and functional groups in the epoxy resin and is generally acecelerated or catalyzed by active tertiary amines. Epoxy curing has heretofore been effected with primary and secondary amines as the source of bifunctional compounds (to effect crosslinking) and tertiary amines as catalysts. Conventional epoxy curing agents are usually polyamines or alkanol amines having two or more functional groups, such as diethylene triamine; triethylene tetramine; triethyl amine; triethanol amine; p,p' - methylene dianiline; o-phenylene diamine; etc.

Since one of the particularly valuable properties of epoxy resins is their ability to "cure" readily from a viscous liquid or thermoplastic resin to a tough, hard, solid resin, the discovery of effective hardening agents is of practical commercial importance.

It has been noted that liquid aliphatic amines are readily blended with epoxy resins and produce good "cures" at concentrations of 10 to 15 parts of aliphatic amine per 100 parts of resin. The cured resins so formed have satisfactory strength at ordinary temperature but exhibit relatively lower strength at elevated temperature (heat deflection temperatures of 75 to 125° C.). On the other hand, aromatic amines and certain aliphatic amines (such as diamino-menthane) which are solid at ordinary temperatures are more difficult to incorporate in epoxy resins as curing agents, but when dispersed or dissolved in the resin at concentrations of 15 to 25 parts per 100 parts of resin produce good cures with high flexural strength (heat deflection temperatures of 150° to 165° C.).

I have now found a distinctly new class of heterocyclic amines of highly aromatic character which is unexpectedly effective as epoxy curing agents. In accordance with this invention, these six-membered cyclic compounds are diaza-tertiary amines (diazines) having the conjugated structure characteristic of aromatics and are exemplified by pyrazine and simple alkyl pyrazines, including mono-, di-, tri-, and tetra-alkyl pyrazines, which alkyl substituent groups have no more than 4 carbon atoms in all and no more than 2 carbon atoms in any substituent radical.

I have found that the tertiary diaza-aromatic structure of pyrazine and alkyl pyrazines has unusual merit in this reaction. Many of these pyrazines are liquids or low melting solids which are readily blended in epoxy resins, having this characteristic in common with the aliphatic amines, while also having a rigid spatial cyclic structure which contributes stiffness or strength to the cured resin heretofore associated with high concentrations of aromatic amine curing agents.

While liquid pyrazinic compounds are preferred, this is more truly a preference for pyrazinic compounds which are soluble or readily dispersible in the uncured resin. Thus, liquid or easily liquefiable compounds can be used with equal effectiveness. At low concentrations these mixes have long pot life but are readily activated on being heated to 80–100° C.

Table A
CURING EPON 828 WITH LIQUID OR SOLID PYRAZINIC COMPOUNDS

| Curing Agent | Form | Conc., p.p.h. | Product Description | | |
|---|---|---|---|---|---|
| | | | 19 day/R.T. | 17 Hr./80° C. | 16 Hr./100° C. |
| Pyrazine | Solid | 10 | No Δ visc. in 19 days | Viscous liquid resin | Hard resin. |
| 2,5-dimethyl pyrazine | Liquid | 10 | ....do.... | ....do.... | Do. |
| 2,6-dimethyl pyrazine | ...do... | 10 | ....do.... | ....do.... | Do. |

Furthermore, the unusual electronic structure of these 1,4-diaza-conjugated diazines appears to augment the catalytic effect. Thus, this class of compounds has high catalytic activity in epoxy curing, ready blendability in epoxy resins and spatial "aromatic" structure to produce strong resins with relatively low concentrations of the diaza-aromatic tertiary amine curing agents. The compounds I have found to be effective are illustrated by but may not be limited to the generic formula—

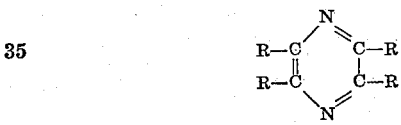

where R is H, $CH_3$, or $C_2H_5$ and where all of the R substituents contain not more than 4 carbon atoms and any R group has no more than 2 carbon atoms.

$C_4R_4N_2$ in the range of 80 to 136 molecular weight.

This generic formula includes, for example, pyrazine, 2-methyl pyrazine, 2-ethyl pyrazine, 2,5-dimethyl pyrazine, tetramethyl pyrazine, but excludes methyl diethyl pyrazine and higher alkyl or aryl pyrazines.

The effectiveness of curing agents in building up structural strength in a resin is often measured by the "heat distortion temperature" test. This is determined by ASTM procedure D648–56 in which a preformed standard resin bar, after being cured 8 hours at 100° C., is suspended at each end and loaded in the middle with a weight to give a uniform fiber stress of 264 p.s.i. The sample on test is then immersed in a temperature controlled hot oil bath equipped with a deflection measuring indicator. The bath is heated at a rate of 2 C. °/minute and the temperature of the bath when the sample under pressure is deflected 0.01 inch is the "heat distortion temperature."

In carrying out the test, the curing agent is blended with the epoxy resin in a range of concentrations anywhere from 5 to 100 parts of curing agent per 100 parts of resin. The mix is then allowed to "cure" over a period of time at room temperature, or subjected to accelerated curing at advanced temperatures and times. In each of the tests referred to herein the reacted epoxy resin and curing agent was subjected to a uniform post cure of 8 hours at 100° C. before being subjected to the heat distortion test.

Epoxy curing with diaza-aromatic tertiary amines has been demonstrated in the following examples:

EXAMPLE I

Fifteen parts of 2,5-dimethyl pyrazine were mixed with 100 parts of Shell Epon resin #828 (epichlorohydrin-bis-phenol A resin; Shell Chemical Company; epoxide equivalent=175–210, molecular weight 350–400) and heated. A firm infusible polymer resin was formed. After a standard post-cure of 8 hours at 100° C., this product had a heat distortion temperature of 133° C., whereas DETA (diethylene triamine), an accepted commercial curing agent, at 10 p.p.h. and with the same post-cure had a distortion temperature of 115° C. Under similar conditions triethanol amine at 12 parts per hundred gave a heat distortion temperature of 75° C.

The unusual superiority of pyrazine and the alkyl pyrazines of the invention over related heterocyclic diaza- and mono-aza compounds has been further demonstrated as follows:

EXAMPLE II

Table B

EPOXY RESIN HARDENING, EPON 828 (SHELL)

| Curing Agent | p.p.h. Resin | Description [1] | Heat Deflection Temp., ° C.[1] |
|---|---|---|---|
| Pyrazine | 15 | Hard resin | 133 |
| 2,5-dimethyl pyrazine | 15 | ----do---- | 133 |
| Piperazine | 15 | Soft gelled resin | |
| 2,5-dimethyl pyrazine | 7.5 | Hard resin | 97 |
| 2,5-dimethyl piperazine | 7.5 | No exotherm on cure | |
| Pyrazine | 7.5 | Hard resin | 95 |
| 2,5-dimethyl piperazine | 7.5 | No exotherm on cure | |
| 2,5-dimethyl piperazine | 15 | Gelled but soft | |
| Piperidine | 5–7 | Soft gelled resin | 75 |

[1] Condition after curing 8 hours at 100° C.

These results show pyrazine and 2,5-dimethyl pyrazine notably better than piperazine and 2,5-dimethyl piperazine (cyclic non-aromatic diamines) or piperidine (a cyclic non-aromatic monoamine) and mixtures of piperazines and pyrazines.

The effective curing of epoxy resins demonstrated by pyrazine and simple alkyl pyrazines is interesting and valuable industrially. While pure pyrazines and alkyl pyrazines are not commonplace industrial chemicals, they can be prepared synthetically as needed. For example, a typical synthesis from aminoketones is described by Karrer, Organic Chemistry, 1950, p. 821, or alternatively, in the process of dehydrocyclizing alkylene polyamines and alkanol amines to 1,4-diazabicyclo-(2.2.2)-octane as disclosed in Herrick, U.S. Patent No. 2,937,176. In this and related processes converting alkylene amines to heterocyclic amines, certain product streams are available from which pyrazine, methyl pyrazine, dimethyl pyrazine and related higher alkyl compounds have been recovered. These product streams rich in pyrazines are, per se, effective in curing epoxy resins. For example, the crude amine mixture (comprising over 60% pyrazines) retained in the stills on the final distillation of the principal diazabicyclooctane product cut was found to be an effective curing agent:

EXAMPLE III

Table C

CURING EPOXY RESIN (SHELL EPON #828) WITH PYRAZINE-RICH AMINES

| Curing Agent | p.p. 100 of Resin | Description [1] | Heat Dist. Temp., ° C.[1] |
|---|---|---|---|
| Crude amine residue | 15 | Hard resin, not self-cured | 120 |
| Active pyrazine component | 9 | | |
| Crude amine residue | 60 | Hard resin, self-cured | 70 |
| Active pyrazine component | 36 | | | ition after curing 8 hours at 100° C.

This pyrazine rich crude amine mixture produced a hard resin with a very creditable heat distortion temperature at low concentrations. At this concentration the mix was not self-curing at room temperature, but required supplemental heating to attain maximum strength. On the other hand, with high concentrations of this curing agent, the composition was self-curing at ordinary temperatures and yielded a resin having a still interesting, though lower, heat distortion temperature. Compositions of this order are valuable for their self-curing properties and their low cost. With epoxy resins priced at 65¢/lb. and crude pyrazines from a heterocyclic tertiary amine process priced at 15¢/lb., a self-curing resin containing 60 p.p.h. of crude pyrazines would have a raw material cost of only 46.25¢/lb. compared to 62.1¢/lb. for a resin cured with 15 p.p.h. of diethylene triamine.

Both of these applications have practical merit. While supplemental heating is required to cure the resin with a low concentration of mixed pyrazine curing agent, such a mix has long pot life (i.e., will not gel for 24 hours or longer at shop temperatures), but is activatable on heating to 100–150° C. to effect rapid setting up at the desired time to a resin with a relatively high heat distortion temperature.

This crude pyrazine obtained as residual oily product in the distillation of a diazabicyclooctane concentrate produced in catalytic dehydrocyclization of alkylene diamines has been analyzed and shown to have a total basic amine content of 8.84 meq./g., which is constituted principally of secondary and tertiary amines, as determined by potentiometric titration (Siggia method):

Table D

| | Meq./g. | Percent of total |
|---|---|---|
| Primary amines | 0.14 | 1.6 |
| Secondary amines | 3.9 | 44.1 |
| Tertiary amines | 4.8 | 54.3 |
| Total | 8.84 | 100 |

On this basis the curing effect of these mixed amines derives mainly from the crosslinking reaction of the secondary amines (piperazines) and the catalytic reaction of the tertiary amines (pyrazines) present. The catalytic effect of this material was further demonstrated by measuring the temperature buildup in the system as epoxy resin and this amine mixture rich in pyrazines reacted: 52 parts by weight of the above crude pyrazines from the diazabicyclooctane process, containing roughly 31 parts by weight of pyrazines, and 200 parts by weight of Epon resin #828 (Shell, epichlorohydrin-bis-phenol A resin; epoxide equivalent 175–210) were mixed in a beaker and the exothermic heat measured against time by means of a thermocouple inserted in the resin mixture:

Table E

| Time, min.: | Temperature, °F. |
|---|---|
| 3 | 70 |
| 22 | 85 |
| 27 | 90 |
| 48 | 105 |
| 70 | 115 |
| 85 | 120 |
| 98 | 135 |
| 110 | 195 |
| 115 | (maximum) 250 |
| 117 | (maximum) 250 |
| 120 | 245 |
| 140 | 215 |
| 150 | 195 |
| 190 | 125 |

A maximum temperature was noted after 115 minutes. Gelation was noted after 110 minutes. A hard black resin resulted on cooling to room temperature.

These crude pyrazines were further tested as curing agents with Ciba's Araldite 6010 resin (diglycidyl ether of bis-phenol A, epoxy equivalent=195). The composition which gave the maximum exotherm was in the range of 60–80 parts of crude amine (containing 36 to 48 parts of pyrazines) per hundred of resin. Pot life was approximately 75 minutes; gel time was approximately 85 minutes. Pot temperature maximum was approximately 294–318° F. At this concentration of pyrazines self-curing resins were formed.

Another rich source of pyrazine and alkyl pyrazines is the mother liquor from which diazabicyclooctane has been crystallized and removed. This liquor was processed to recover pyrazines in more concentrated form for more effective use.

EXAMPLE IV

A mother liquor from diazabicyclooctane synthesis was treated with formaldehyde to fix the primary and secondary amines and then fractionated to recover pyrazines:

4289 g. mother liquor was treated with 430 g. formaldehyde, 90% (paraform); cooled, filtered and the filtrate flash distilled to recover 2119 g. @ 74–76 mm. Hg and 75°–128° C. This product was redistilled in a 20 plate column at 10/1 reflux ratio to obtain the following concentrated pyrazine cuts:

Table F

5 C.°. CUTS FROM FORMALDEHYDE TREATED MOTHER LIQUOR ANALYZED BY M.S.

| | Cut No. | | | | | | | | | |
|---|---|---|---|---|---|---|---|---|---|---|
| | Init. to 140 | 2 140–150 | 3 150–155 | 4 155–160 | 5 160–165 | 6 165–170 | 7 170–174 | 8 174–175 | 9 175–180 | 10 180–181 |
| Wt. Percent of Total | 2.9 | 5.4 | 2.9 | 3.2 | 2.5 | 6.3 | 9.2 | 1.9 | 6 | 5.7 |
| $C_2$-pyrazine | | 28 | 57 | 57 | 46 | 21 | 1.8 | | | 0.4 |
| $C_3$-pyrazine | | 1.6 | 4.7 | 12 | 22 | 35 | 48.7 | 42 | 25 | 1.2 |
| $C_1$-pyrazine | | 1.2 | 0.1 | | | | 0.7 | | | |
| $C_4$-pyrazine | | | 0.1 | 0.2 | 0.5 | 1.2 | 3.4 | 6.8 | 13.2 | |
| Diazabicyclooctane | | | 0.8 | | | | 17.7 | | | |
| Piperazines | | | 8.0 | | | | 28.6 | | | |
| $H_2O$ | | | 0.1 | | | | 0.2 | | | |
| Arom. Solvents | | 60 | 29 | 7 | 4 | 2.4 | | | | |

Reference boiling points:
Pyrazine, 118° C.
Methyl pyrazine, 135° C.
2,3-dimethyl pyrazine, 156° C.
2,5-dimethyl pyrazine, 155° C.
2,6-dimethyl pyrazine, 175° C.
Trimethyl pyrazine, 171°–172° C.

The 150–165° C. cuts comprising 8.6 wt. percent of the total mother liquor contained $C_1$ to $C_4$ substituted pyrazines which comprised 62 to 69% of the product cuts, with $C_2$-pyrazines (dimethyl or ethyl) making up at least 75% of these composited cuts. In the higher boiling range fractions of 160–175° C. the $C_2$–$C_4$ substituted pyrazines predominated and comprised over 55% of the product cut. The composite recovered alkyl pyrazines, with accompanying congeners comprising cuts 3, 4, 5 and 7, as described above, showed good epoxy curing at 10 parts per 100 of epoxy resin and produced firm resins having deflection temperatures of 98° C. at the optimum, as shown by the following:

EXAMPLE V

Table G

| Curing Agent | P.p.h. of Resin | P.p.h. Active Pyrazines | Description [1] | Heat Defl. Temp., °C.[1] |
|---|---|---|---|---|
| Composite pyrazine rich ML+$CH_2O$ treat | 4.5 | 3 | Hard resin | 48 |
| Do | [2] 10 | [2] 6 | Good cure | 98 |
| Do | 15 | 9 | do | 80 |
| Do | 21.5 | 13 | Hard resin | 73 |
| Do | 34 | 20 | Self-cured | 42 |

[1] After a uniform post-cure of 8 hours at 100° C.
[2] Optimum.

A preferred curing agent ratio would be in the range of 5 to 15 parts of treated mother liquor per hundred of resin for high strength, but with optimum deflection resistance obtained at about 6 to 9 parts of pyrazine concentrate per hundred of resin. Concentrations above 20 p.p.h. of pyrazines would be self-curing, i.e., producing hard resins, though having lower resistance to heat deflection.

In the lower boiling cuts of mother liquor the alkyl pyrazines are concentrated to over 90% by eliminating the inert aromatic component. For example, formaldehyde treated filtrate from mother liquor from diazabicyclooctane synthesis was distilled and analyzed as follows:

The high content of non-reactive aromatics in these cuts was eliminated by extraction of pyrazines and other amines with water. The water extract was saturated with caustic and the upper layer removed and redistilled. A total of 539 g. from the 130–145° C. cut and 1261 g. from the 145–150° C. cut, or in all, 1800 g. were fractionated with results as follows:

*Table I*

DISTILLATION AND ANALYSIS OF THE WATER EXTRACT FROM THE 130–150° C. CUTS OF PARAFORM TREATED MOTHER LIQUOR

| Fraction | 1 | 3 | 4 | 5 |
|---|---|---|---|---|
| Boiling Range, ° C | 85–107 | 134–145 | 145–152 | 152–161 |
| Wt., gms. | 230 | 52 | 187 | 239 |
| Recovery [1] | 10.6 | 6.0 | 23.3 | 30.3 |
| M.S. Analysis: | | | | |
| $H_2O$ | 64.6 | 11.5 | 4.4 | 2.8 |
| N,N'-Methylethyl piperazine | 0.3 | 0.8 | 0.7 | 0.6 |
| Dimethyl pyrazine | 23.1 | 63.9 | 71.7 | 73.7 |
| Ethyl pyrazine | 10.6 | 18.7 | 19.9 | 17.3 |
| Methyl pyrazine | 0.7 | 0.9 | 0.3 | |
| Alkyl pyrazine | 0.4 | 1.0 | 1.3 | 3.4 |

[1] Percentage based on amines contained in fraction divided by the amines contained in original fraction.

Fractions 4 and 5 from the above table are the items identified as "53SF cuts 4 and 5" in the following tests on Epon resin hardening agents:

EXAMPLE VI

*Table J*

| Curing Agent | P.p.h. of total cut | P.p.h. Pyrazines | Description [1] | Deflection Temp. ° C.[1] |
|---|---|---|---|---|
| Pyrazine-rich mother liquor $CH_2O$ treated and $H_2O$ extracted: | | | | |
| 53SF cut 4 | 15×.93=14 | | Hard resin | 82 |
| 53SF cut 5 | 15×.94=14 | | do | 83 |

[1] Condition after curing 8 hours at 100° C.

*Table H*

ANALYSIS OF DISTILLATES OBTAINED FROM PARAFORM TREATED MOTHER LIQUOR

| Boiling Range, ° C | 130–145 | 145–150 | 150–155 | 155–160 |
|---|---|---|---|---|
| Xylenes | 77.9 | 48.5 | 36.5 | 26.4 |
| Methyl pyrazine | 0.2 | 0.2 | 0.2 | 0.1 |
| Ethyl pyrazine | 9.6 | 14.2 | 11.5 | 9.7 |
| Dimethyl pyrazine | 11.9 | 31.6 | 30.4 | 26.2 |
| Diethyl pyrazine | | 3.7 | 11.2 | 20.0 |
| Methylethyl pyrazine | | | 2.2 | 1.4 |
| Diazabicyclooctane | | | | 5.9 |
| Dimethyl piperazine | 0.2 | 1.8 | 8.0 | 10.3 |

These fractions contained diaza-heterocyclic tertiary amines, especially alkyl pyrazines to over 93% of the total distillate fraction and produced hard resins having heat deflection temperatures above 82° C. when used in the ratio of 15 parts pyrazine concentrate per 100 parts of epoxy resin.

In a subsequent preparation, the higher boiling distillate fractions between 150–160° C. (from Table H above) were subjected to a selective separation of more basic piperazines and diazabicyclooctane from the less basic pyrazines and alkyl pyrazines by treatment with $CO_2$:

*Table K*

DISTILLATION AND ANALYSIS OF FILTRATE FROM $CO_2$-TREATMENT OF PORTIONS OF FORMALDEHYDE-TREATED MOTHER LIQUOR

| Fraction | 1 | 2 | 3 | 4 | 5 | 6 | 7 |
|---|---|---|---|---|---|---|---|
| Boiling Range, ° C | 142–146 | 146–149 | 149–154 | 154–158 | 158–161 | 161–165 | 165–171 |
| Weight, grams | 596 | 374 | 440 | 444 | 157 | 294 | 216 |
| Recovery [1] | 9.9 | 8.2 | 11.4 | 14.8 | 5.9 | 12.0 | 9.3 |
| M.S. Analysis: | | | | | | | |
| Xylenes | 63.9 | 52.2 | 43.7 | 27.2 | 18.1 | 11.0 | 6.5 |
| N,N'-Methylethyl piperazine | 0.2 | 0.2 | 0.3 | 0.4 | 0.7 | 1.0 | 1.1 |
| N,N'-Diethyl piperazine | 0.2 | 0.5 | 0.6 | 1.3 | 1.9 | 2.8 | 3.7 |
| Methyl pyrazine | 0.3 | | | | | | |
| Ethyl pyrazine | 11.3 | 13.6 | 15.1 | 17.1 | 16.4 | 12.7 | 4.3 |
| Dimethyl pyrazine | 20.7 | 27.1 | 31.9 | 37.9 | 37.9 | 30.5 | 9.5 |
| Methylethyl pyrazine | 2.7 | 5.8 | 7.9 | 15.0 | 23.3 | 38.4 | 67.4 |
| Diazabicyclooctane | 0.8 | 0.6 | 0.4 | 0.9 | 1.6 | 3.4 | 6.9 |

[1] Percentage based on amines contained in fraction divided by amines contained in original distillate.

The above cuts 4, 5, 6 and 7 containing alkyl pyrazines in 70 to 81% concentration are the cuts identified as 58SF cuts 4, 5, 6 and 7 in the following tests:

EXAMPLE VII

Table L

| Curing Agent | P.p.h. of total | P.p.h. Pyrazines | Description [1] | Heat Deflection Temp., °C.[1] |
|---|---|---|---|---|
| CH$_2$O treated ML fractions "CO$_2$" treated and distilled: | | | | |
| 58SF cut 4 | 15×.70=10.5 | | Hard resin | 52 |
| 58SF cut 5 | 15×.78=11.7 | | ...do... | 58 |
| 58SF cut 6 | 15×.81=12.1 | | ...do... | 69 |
| 58SF cut 7 | 15×.80=12.0 | | ...do... | 79 |

[1] Condition after curing 8 hours at 100° C.

It is evident from the analyses that these pyrazine concentrates are practically free of piperazine and alkyl piperazines. On a xylene-free basis the predominant constituents (70 to 81%) are $C_2$- and $C_3$-pyrazines which showed good epoxy curing activity. While the deflection temperatures on these cured resins are relatively low, alkyl pyrazines can be used effectively in formulations where high temperature strength is not paramount, for example, in molding and casting compositions, in sealing and coating compositions, in binding applications, etc., where a reasonable to long pot life is desired for the mix and where the molded, cast or coated product can be heated to temperatures of about 120–150° C. to effect temperature activation of the catalyst and resin curing.

As has been more fully described above, mixed diaza-heterocyclic amines consisting of both piperazines and pyrazines can be processed to separate the more basic secondary amines (piperazines) from the less basic but more active tertiary aromatic amines (pyrazines) for more effective curing. Such separations have been described by chemical means, but even simple extraction with water effects a satisfactory concentration of alkyl pyrazines from a mixture with simple, more soluble alkyl amines and piperazines.

EXAMPLE VIII 100 ml. of mother liquor from diazabicyclooctane synthesis and 400 ml. of water were mixed and allowed to separate. An oily layer comprising 13 ml. was separated and recovered. By mass spectrometer analysis it comprised:

Table M

| | Vol. percent |
|---|---|
| Cumene | 16.3 |
| Xylene | 23.2 |
| Toluene | 1.9 |
| Other aromatics | 2.4 |
| Total aromatics | 43.8 |
| Pyrazine | 5.0 |
| Pyrazine-$C_4$ substituted | 9.0 |
| Pyrazine-$C_3$ substituted | 14.0 |
| Pyrazine-$C_2$ substituted | 13.6 |
| Pyrazine-$C_1$ substituted | 10.5 |
| Pyrazine higher than $C_4$ substituted | 0.8 |
| Total pyrazines | 52.9 |
| Diazabicyclooctane and homologs | 1.0 |
| Piperazine and homologs | 0.6 |
| N-aminoethyl piperazine | 1.1 |
| Total "non-pyrazine" N-compounds | 2.7 |

Discounting the unreactive solvent aromatics, the pyrazines constitute 95% of the functional product and the preferred lower alkyl substituted pyrazines having no more than four carbon atoms in substituent groups— constitute 94% of the functional product. These pyrazine concentrates have been shown to be effective epoxy curing agents.

Other methods of treating the crude amine mixture serve also to concentrate the desired pyrazines. It has been found, for example, that diazabicyclooctane mother liquor when refluxed with diethyloxalate formed condensation products with the primary and secondary amines. The resultant mixture was vacuum fractionated to remove an alcohol cut, an amine cut and a residue. The amine cut was further fractionated to obtain two alkyl pyrazine fractions boiling 155–160° C. and 173–175° C., respectively, comprised of $C_1$ to $C_4$ pyrazines of over 90% purity. Recovery of alkyl pyrazines overall was over 90%.

A considerable emphasis has been placed on the self-curing of epoxy resins at room temperature. While this is of importance for low temperature applications and can be used as a measure of activity of the curing agent, it generally requires quite high concentrations of the curing agent, such high concentrations, in some cases, as to materially affect the physical properties of the final resin. For example, with 65 parts of our crude pyrazines per hundred of epoxy resin, self-cured resins were formed, but generally these had deflection temperatures below 90° C. Since curing with supplementary heating is quite economical and practical by passing the cast or molded epoxy product, such as floor or wall tile segments, through an oven on a continuous conveyor belt, it is more practical to use a smaller amount of curing agent, such as 5 to 20 p.p.h. of resin, and effect heat (oven) curing with better retained hardness. This is accomplished, for example, by 1 to 4 hours heating at 150 to 200° C. or 8 hours of oven heating at 100° C.

In many epoxy resin applications high structural strength is not required, such as in coating and paving compositions. Such applications can make use of specific pyrazines or pyrazine-rich fractions in either low or high concentrations relative to epoxide depending solely on the pot life and the rate of cure desired. With low concentrations of curing agent, pot lift can be extended to days or weeks. It is only necessary to heat the mixture to about 100–150° C. to effect rapid setting and catalyzed curing. With relatively high (above 20 p.p.h. of resin) curing agent concentrations, pot life may be fairly short, of the order of 8 hours or less, giving a resin that may effect autogenous curing in 12 to 36 hours, or catalyzed curing with heat in substantially less time. Where high deflection temperature is relatively unimportant relatively large concentrations of crude pyrazine mixtures would be further preferred on the basis of material costs. With crude pyrazines priced e.g. at 15¢/lb. and epoxy resins at 65¢/lb., a 15 p.p.h. formulation would cost 58.5¢/lb. of finished resin, whereas a 65 p.p.h. formulation would cost only 45.3¢/lb. and produce a quicker gelling, low temperature self-curing resin.

Obviously many modifications and variations of the invention as hereinbefore set forth may be made without departing from the spirit and scope thereof, and therefore only such limitations should be imposed as are indicated in the appended claims.

What is claimed is:

1. The method of producing a resinified product which comprises mixing and reacting a polyepoxide having a 1,2-epoxy equivalency greater than 1 with a diazo-aromatic tertiary amine having the formula

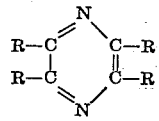

wherein each R is independently selected from the group consisting of H, $CH_3$ and $C_2H_5$ and the sum of the total R substituent carbon atoms is not more than 4.

2. The method of claim 1 wherein the diaza-aromatic tertiary amine is pyrazine.
3. The method of claim 1 wherein the diaza-aromatic tertiary amine is methyl pyrazine.
4. The method of claim 1 wherein the diaza-aromatic tertiary amine is dimethyl pyrazine.
5. The method of claim 1 wherein the diaza-aromatic tertiary amine is ethyl pyrazine.
6. The method of claim 1 wherein the diaza-aromatic tertiary amine is methylethyl pyrazine.
7. A heat curable composition comprising a polyepoxide having a 1,2-epoxy equivalency greater than 1 and a diaza-aromatic tertiary amine having the formula

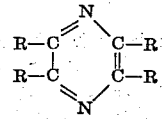

wherein each R is independently selected from the group consisting of H, $CH_3$ and $C_2H_5$ and the sum of the total R substituent carbon atoms is not more than 4.

8. The heat curable composition of claim 7 wherein the diaza-aromatic tertiary amine is present in a ratio of from 5 to 20 parts per hundred parts of polyepoxide.

References Cited by the Examiner

UNITED STATES PATENTS

| | | | |
|---|---|---|---|
| 2,824,082 | 2/1958 | Newey | 260—47 |
| 2,937,176 | 5/1960 | Herrick | 260—250 |
| 2,946,793 | 7/1960 | Michaels et al. | 260—250 |

FOREIGN PATENTS 629,111  9/1949  Great Britain.

OTHER REFERENCES

Grant, "Hackh's Chemical Dictionary," 3rd ed., McGraw-Hill Book Co., Inc., 1944, p. 310 relied on (copy in division 60).

Lee et al., "Epoxy Resins," McGraw-Hill Book Co., Inc., New York, 1957, pp. 15 and 99 particularly relied on TP986.E6L4).

Karrer, "Organic Chemistry," Elsevier Publishing Co., New York, 1938, p. 748 relied on QD251.K32).

SAMUEL H. BLECH, *Primary Examiner.*

HAROLD BURSTEIN, LOUISE P. QUAST, *Examiners.*

A. LIBERMAN, T. D. KERWIN, *Assistant Examiners.*